Jan. 31, 1956   E. L. ELDER   2,732,839
WATER TANK TRAILER HEATING SYSTEM
Filed March 7, 1950
Fig. 1
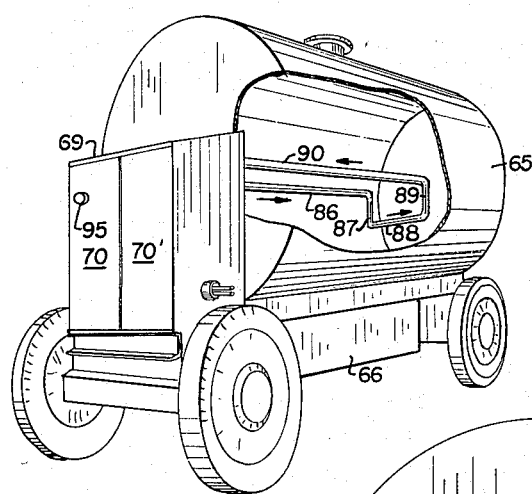
Fig. 2
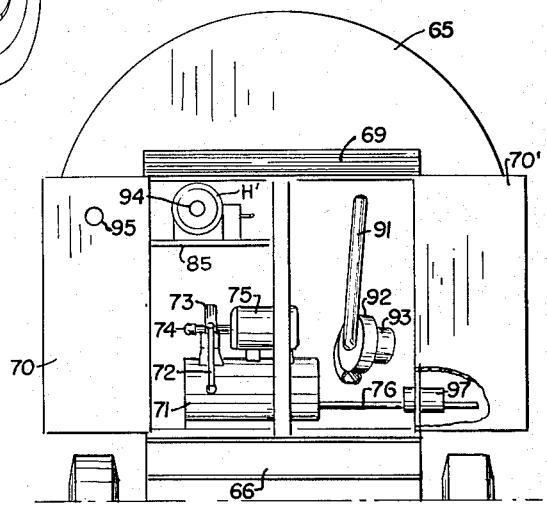
Fig. 3
INVENTOR.
EDGAR LEE ELDER
BY
ATTORNEYS

United States Patent Office 2,732,839
Patented Jan. 31, 1956

2,732,839

WATER TANK TRAILER HEATING SYSTEM

Edgar Lee Elder, Denver, Colo.; The United States National Bank of Denver, executor of said Edgar Lee Elder, deceased, assignor to Elder Trailer and Body, Inc., Denver, Colo., a corporation of Colorado Application March 7, 1950, Serial No. 148,118

5 Claims. (Cl. 126—344)

This invention relates to heating systems for trailers and the like, which are adapted to be moved along highways, and more particularly to heating systems for water tank trailers which may be used in conjunction with other trailers, such as kitchen trailers and shower trailers.

The advent of improved highway systems and the increase in the number of vehicles using the same have increased considerably the mobility of the population, even with respect to trips of a few days or weeks duration. The popularity of vehicle drawn trailers, adapted to travel on such highways, has increased considerably in recent years, and such trailers have also often been utilized as stationary living quarters or the like, sometimes for relatively long periods of time, in the absence of sufficient temporary or semi-permanent housing accommodations. In the case of groups of individuals who may travel from place to place in connection with their work, and be located at any one place for an indeterminate period of time, such as from a few days to several months, the problem of finding suitable temporary housing accommodations has often been quite acute. Furthermore, the work of such groups is often located at places relatively distant from any town or other place at which temporary housing accommodations would be available. One example of such a group is a seismograph crew, which explores by geophysical methods the subterranean structures to determine, if possible, whether such structure would tend to indicate the presence of valuable material, such as oil. Such a crew may work in one locality for several months, and the next locality for work may be a thousand miles or more away. Also, the locality for such work is more often in a sparsely settled region, where towns are far apart and temporary housing and office accommodations may be unavailable. Due to the temporary character of the work, and the fact that the term of stay in any particular locality is generally indefinite, the cost of temporary housing and office accommodations, even if available, is more likely than not unduly high. Consequently, it is an advantage to the operator of such a crew to have available transportable equipment providing living quarters and office space, which may be moved from place to place without undue difficulty, and may be placed at any desired spot or location, irrespective of towns or other more permanent habitable places.

An entire house, of course, cannot be built so that it can be moved readily along the highway, since the width as well as the total length of trailers and the like is limited not only by the highways themselves, but also by law. Thus, to provide adequate housing and office accommodations for a seismograph crew, for instance, the equipment may be divided into a number of units, each comprising a trailer fitted out for a specific use or uses. Thus, for each such crew, there may be an office trailer, a dining trailer, a kitchen trailer, a shower trailer, and one or more sleeping trailers, the number of the latter depending upon the size of the crew. All these trailers may be grouped together at one spot, together with additional auxiliary equipment, such as a water tank trailer, and a trailer for supplying electricity for lighting and similar purposes.

In order to provide sufficiently adequate and comfortable living conditions, to reduce turnover of personnel, such trailers should be comfortable to eat, sleep or work in, during the extremes of temperature and weather conditions that may occur. This includes adequate heating for winter conditions and particularly adequate heating so that the water in a water tank trailer will not freeze and so that the water supplied from the water tank trailer to another trailer will not freeze.

Among the objects of the present invention are to provide a novel heating system for water tank trailers and the like; to provide such a heating system which permits the use of only one heating unit, such as a circulating heater, for any one trailer; to provide such a heating system which can be used for heating a water tank, disposed on a trailer, to prevent freezing; to provide such a heating system adapted not only to heat the water in a water tank but also hoses or pipes connecting the water tank trailer with other trailers, such as a shower trailer, kitchen trailer, and the like; to provide such a heating system which is comparatively inexpensive to construct and is reliable and efficient in operation, and requires comparatively little maintenance; and to provide such a heating system which is capable of considerable variation to accommodate differences and variations in trailer construction and equipment, such as required by different uses to which the trailer is to be put.

Other objects, and the novel features of this invention, will become apparent from the description which follows, taken in connection with the accompanying drawings, in which:

Fig. 1 is a perspective view of a water tank trailer, the water in which is heated to prevent freezing by a heating system constructed in accordance with this invention;

Fig. 2 is a rear elevation of the water tank trailer of Fig. 1, with a portion of the undercarriage omitted and the doors of a rear cabinet open to show the parts installed therein; and Fig. 3 is a top plan view, partly in section, of the rear portion of the water tank trailer and the rear portion of two other trailers, to each of which water is supplied from the tank trailer by connecting hoses or pipes, the latter being heated by a heating system further constructed in accordance with this invention.

As illustrated in Figs. 1 to 3, inclusive, a heating system of this invention may be installed in a water tank trailer which, as in Fig. 1, may include a tank 65 mounted on a wheeled undercarriage 66, the tank 65 being adapted to contain a supply of water which may be transferred under pressure to other trailer units, such as a kitchen trailer 67 and a shower trailer 68, for use in each of the latter, as in Fig. 3. Pumping and other auxiliary equipment may be placed in a cabinet 69 having doors 70 and 70', and mounted on the rear of the water trailer. Such equipment may include a pressure tank 71 to which a discharge pipe 72 leads from a pump 73, the pump intake pipe 74 being connected with the tank 65. Pump 73 may be of the centrifugal or any other suitable type and driven by a motor 75, the pump and motor being mounted in any convenient position, such as on top of the pressure tank 71. The water for use in the kitchen trailer 67 and shower trailer 68 may be delivered through a pipe or hose 76 leading from the pressure tank 71 to a T 77, from which a branch pipe or hose 78 and 79, respectively, extends to the kitchen trailer and shower trailer. Due to the facility with which connections may be made and the apparatus set up and taken down and because of its flexibility, a sufficiently strong hose will normally be preferred to a rigid pipe. The hoses 78 and 79 are connected with the water lines of the trailers, and may also be connected inside the trailers with return lines 80 and 81, each having a valve, such as valve 82 in line 80, the return lines 80 and 81 being connected at a T 83 to a hose 84 which leads back to the tank 65. In extremely cold weather, the valves 82 may be opened to any desired extent, to provide a continuous circulation of water through the hoses back to tank 65, and thereby avoid any possibility of the water freezing. However, except in extremely cold weather, the water in tank 65 and the various hoses may be prevented from freezing by a heating system of this invention.

Such a heating system may include a heater H' mounted on a shelf 85 in cabinet 69, and adapted to supply heated air to pipes or ducts extending within the tank 65. A suitable arrangement of the latter, as in Fig. 1, may include, in turn, a horizontal inlet pipe 86 which extends from the rear of the tank to a point adjacent the front, a down leg 87, a horizontal traverse 88, an up leg 89 and then a horizontal return pipe 90. These pipes may be welded or brazed together to form a single unit, or may be formed by a single pipe, while the flow of air through the piping within the tank may follow generally the direction of the arrows of Fig. 1. Upon return through the exit pipe 90, the air is led downwardly through a pipe or duct 91 to a blower 92, driven by a motor 93, mounted thereon as a unit. The heated air discharged by blower 92 tends to maintain the interior of cabinet 69 warm, thus warming the water at the rear of the tank, while the down leg 87, horizontal traverse 88, and up leg 89 provide additional heat for the water at the opposite end of the tank.

Heater H' may be a conventional gasoline or oil fired heater, such as of the "Hunter" type, which is provided with a combustion chamber having an exhaust opening 94 and an enclosed motor driven fan which propels air around the combustion chamber for axial discharge of the heated air at the opposite end of the heater, into the horizontal inlet pipe 86. An opening in door 70, which may be provided with an exhaust directing pipe 95, preferably coincides with exhaust opening 94 of heater H' when door 70 is closed, so that the gases resulting from combustion will be discharged to the atmosphere.

In further accordance with this invention, heated air discharged by blower 92 passes into an insulated conduit 96, adapted to be connected to the cabinet 69 by fitting over a ferrule 97, through which hoses 76 and 84 extend, insulated conduit 96 enclosing the hoses and forming a passageway for heated air to flow to a junction box 98, which encloses the T connections, and then through a pair of insulated conduits 99 and 99' to boxes 100 and 100', respectively, adjacent the shower and kitchen trailers, respectively. Conduits 96, 99 and 99' may be made of thin sheet metal with a covering of asbestos or the like, or may be relatively large, flexible hoses, such as insulation covered rubber with wire reinforcement, while junction box 98 may be made of sheet metal with an asbestos covering and is preferably provided with a removable cover, to provide access to the T's 77 and 83. With the hoses 76, 78, 79, 80, 81 and 84 disposed within insulated conduits, the heated air passing around the hoses will prevent the water in the hoses from freezing during reasonably cold weather. At the kitchen and shower trailers, respectively, each of the boxes 100 and 100' preferably is either spaced slightly from the trailer wall, as shown, or other suitable provision made for escape of a small amount of air, to permit a continuous circulation of heated air through the insulated conduits.

As will be observed, the blower 92 pulls heated air through the pipes in the water tank, and also discharges such air into a space or spaces, including the interior of cabinet 69 and insulated conduits 96, 99 and 99'. During extremely cold weather, of course, such as 0° F. and below, it is preferable to provide a continuous circulation of water through the hoses, so as to obviate any possibility of freezing, although when the temperature is higher, such as above zero, the heater H' and the blower 92 and the insulated conduits will usually take care of the situation.

As will be evident from Fig. 3, the water tank trailer may be drawn up alongside the kitchen trailer, or the shower trailer, the latter two preferably being placed end to end, so that as short a connection as possible can be made between the water tank and the two trailers which primarily require water. Generally, there is sufficient space in a sparsely settled region to permit substantially any parking arrangement desired. However, if the contour of the terrain is such that this exact arrangement cannot be produced, then the water trailer may be parked perpendicularly to the dining trailer and kitchen trailer, or perhaps spaced a short distance therefrom. In any event, the water connections are preferably made through flexible hoses, and the conduits 96, 99 and 99' may be made sufficiently flexible to accommodate any trailer arrangements. It will be understood, of course, that during the warmer months of the year, it is normally unnecessary to heat the water hoses or pipes connecting different trailers, and that the heater H' will be operated only when there is danger of the water freezing.

From the foregoing, it will be evident that the heating system of this invention fulfills to a marked degree the requirements and objects hereinbefore set forth.

The principles of this invention, when applied to water tank trailers, prevents the water from freezing during unduly cold weather, as by placing a heating pipe or the like in the water tank, so that heated air may be forced into the pipe from a heater, while air suction and discharge means are placed at the outlet end of the water heating pipe. Furthermore, such air discharge means may direct the heated air into a conduit which encloses the hoes or pipes leading to trailers or the like to which water is supplied from the water tank, thus assisting in preventing the water in such hoses or pipes from freezing. By combining the heating of the water in the tank with the heating of the hoses or pipes connecting the water tank trailer with other trailers, a more efficient and effective, as well as a simplified construction, is obtained.

Although one embodiment of this invention has been illustrated and described, and specific types of heaters and equipment have been shown, it will be understood that other types of heaters and equipment may be utilized, and that other embodiments may exist, without departing from the spirit and scope of this invention.

What is claimed is:

1. A heating system for a water trailer having a tank, comprising the combination of a cabinet at one end of said tank; a heater disposed in said cabinet at one side thereof; a pipe extending from said heater horizontally to a point adjacent the opposite end of said tank, then downwardly, then laterally, then upwardly, and then horizontally to said cabinet; and air suction and discharge means at the end of said pipe, within said cabinet.

2. In a heating system for a water trailer having a tank and connected by a water line with at least one other trailer, the combination of a pipe extending within said tank; a heater connected to the inlet of said pipe; a conduit extending from said water trailer to said other trailer and enclosing said water line; and air suction and discharge means at the outlet end of said pipe for pulling heated air through said pipe from said heater and also discharging said air into said conduit.

3. In a heating system for a water trailer having a tank and a water pressure line to a pair of other trailers, said water trailer also having a compartment at the rear of said tank and a pump in said compartment for producing water pressure for said line, the combination of an air duct extending within said tank between spaced points in said compartment; an air heater connected to one end of said duct; an air blower connected to the other end of said duct, for pulling heated air through said duct from said heater and also discharging said air into said compartment; and an insulated conduit enclosing said water line and extending from said compartment to said pair of other trailers, said conduit receiving heated air discharged by said blower.

4. In a heating system for a water trailer having a tank and a water pressure line to a pair of other trailers, said water trailer also having a compartment at the rear of said tank and a pump in said compartment for producing water pressure for said line, as defined in claim 3, wherein said water trailer includes a pressure receiver in said compartment connected to the discharge of said pump and to said water line; and including a return water line enclosed within said conduit and extending from each said other trailer back to said tank; a valve connection in each said other trailer between said pressure line and said return line, said pressure line and said return line each comprising a flexible hose leading from said compartment to a T and a pair of branch hoses leading from said T to the respective trailer; and said conduit includes a junction box having a removable top enclosing said Ts, branch conduits enclosing said branch hoses, and boxes at said trailers having an opening for discharge of air, so as to permit flow of heated air through said conduit and branch conduits.

5. A heating system for a water tank trailer comprising a fuel combustion heater; a compartment for said heater and for pumping equipment at one end of said tank; a heated air pipe extending longitudinally in said tank from said heater to a point adjacent the opposite end of said tank and back to said compartment; air suction and discharge means in said compartment at the end of said pipe; and means independent of said pipe for discharging products of combustion from said heater to a point exteriorly of said trailer.

References Cited in the file of this patent

UNITED STATES PATENTS

| | | |
|---|---|---|
| 237,555 | Laube | Feb. 8, 1881 |
| 477,811 | Malloy | June 28, 1892 |
| 926,332 | Hunt | June 29, 1909 |
| 1,426,900 | Neal | Aug. 22, 1922 |
| 1,604,049 | Hromas | Oct. 19, 1926 |
| 1,699,810 | Robinson | Jan. 22, 1929 |
| 1,820,778 | Carson | Aug. 25, 1931 |
| 1,832,638 | Kitchen | Nov. 17, 1931 |
| 1,949,471 | Hildebrand | Mar. 6, 1934 |
| 1,986,561 | Davis | Jan. 1, 1935 |
| 1,992,468 | Bradley | Feb. 26, 1935 |
| 2,076,780 | Haupt | Apr. 13, 1937 |
| 2,133,326 | Johanson | Oct. 18, 1938 |
| 2,179,873 | Anderson | Nov. 14, 1939 |
| 2,201,312 | Hauser | May 21, 1940 |
| 2,229,277 | Clements | Jan. 21, 1941 |
| 2,247,896 | Wagner | July 1, 1941 |
| 2,257,070 | Perlick | Sept. 23, 1941 |
| 2,262,748 | Berman | Nov. 18, 1941 |
| 2,272,356 | Sims | Feb. 10, 1942 |
| 2,372,897 | Holthouse | Apr. 3, 1945 |
| 2,405,145 | Holthouse | Aug. 6, 1946 |
| 2,417,463 | Anderson | Mar. 18, 1947 |

FOREIGN PATENTS

| | | |
|---|---|---|
| 114,649 | Switzerland | Jan. 17, 1925 |